United States Patent
Lashkari et al.

(10) Patent No.: US 10,013,995 B1
(45) Date of Patent: Jul. 3, 2018

(54) COMBINED REFERENCE SIGNAL FOR ACOUSTIC ECHO CANCELLATION

(71) Applicant: Cirrus Logic International Semiconductor Ltd., Edinburgh (GB)

(72) Inventors: Khosrow Lashkari, Palo Alto, CA (US); Justin L. Allen, Mesa, AZ (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/591,418

(22) Filed: May 10, 2017

(51) Int. Cl.
| | |
|---|---|
| *G10L 21/0208* | (2013.01) |
| *G10L 15/22* | (2006.01) |
| *G10L 21/0264* | (2013.01) |
| *G10L 21/0232* | (2013.01) |

(52) U.S. Cl.
CPC ........ *G10L 21/0208* (2013.01); *G10L 15/222* (2013.01); *G10L 21/0232* (2013.01); *G10L 21/0264* (2013.01); *G10L 2015/223* (2013.01); *G10L 2021/02082* (2013.01)

(58) Field of Classification Search
CPC ....... G10L 21/0208; G10L 2021/02082; G10L 19/26; G10L 19/265; G10L 19/0204; G10L 21/028
See application file for complete search history.

(56) References Cited

U.S. PATENT DOCUMENTS

| | | | | |
|---|---|---|---|---|
| 2006/0002547 A1* | 1/2006 | Stokes | ................. | H04M 9/082 379/406.14 |
| 2009/0248403 A1* | 10/2009 | Kinoshita | .............. | H04N 7/147 704/219 |
| 2013/0129101 A1 | 5/2013 | Tashev et al. | | |
| 2014/0169568 A1* | 6/2014 | Li | ......................... | H04M 9/082 381/17 |
| 2015/0371659 A1* | 12/2015 | Gao | .................... | G10L 21/0208 704/226 |
| 2016/0044394 A1* | 2/2016 | Derom | ..................... | H04R 1/00 367/95 |
| 2016/0050489 A1 | 2/2016 | Lashkari et al. | | |
| 2017/0092256 A1* | 3/2017 | Ebenezer | ............. | G10K 11/175 |

* cited by examiner

*Primary Examiner* — Mohammad Islam
(74) *Attorney, Agent, or Firm* — Norton Rose Fulbright US LLP (57) ABSTRACT

Acoustic echo cancellation (AEC) processing may be improved by performing echo cancellation using a combined multi-channel reference signal. Two or more reference signals, such as a left and right channel of a stereo source, may be combined and provided to an AEC block configured to receive the combined signal and perform AEC processing using the combined signal. The AEC block may include an adaptive filter that performs operations that cause pre-whitening of the combined reference signal and de-correlation of the individual channels within the combined reference signal. The pre-whitening of the signal flattens the spectrum of the combined reference signal, which may improve convergence speed of the AEC processing in cancelling the echo. The de-correlating of the signal cancels inter-channel correlation between the multiple channels, which may improve convergence speed of the AEC processing in cancelling the echo.

20 Claims, 5 Drawing Sheets

COMBINED REFERENCE SIGNAL FOR ACOUSTIC ECHO CANCELLATION

FIELD OF THE DISCLOSURE

The instant disclosure relates to audio systems. More specifically, portions of this disclosure relate to acoustic echo cancellation (AEC) in audio systems.

BACKGROUND

In an electronic device, the sound from a loudspeaker can be reflected or coupled back to a microphone after some finite delay, producing an echo. Audio devices may include circuits that perform acoustic echo cancellation (AEC), for reducing or eliminating the effects of such echoes. One example situation using AEC is a "barge-in" application. During a "barge-in" a user may speak a voice command while listening to music or other sound generated by a loudspeaker of an electronic device. The user is thus "barging in" with the voice command during playback of media. The electronic device can have difficulty accurately detecting and recognizing the voice command as a result of echo from the output of the loudspeaker. As a further challenge to voice recognition, there may be multiple loudspeakers generating sound, and thus multiple echoes to be cancelled. A conventional AEC system for improving voice recognition is shown in FIG. 1.

Figure 1:
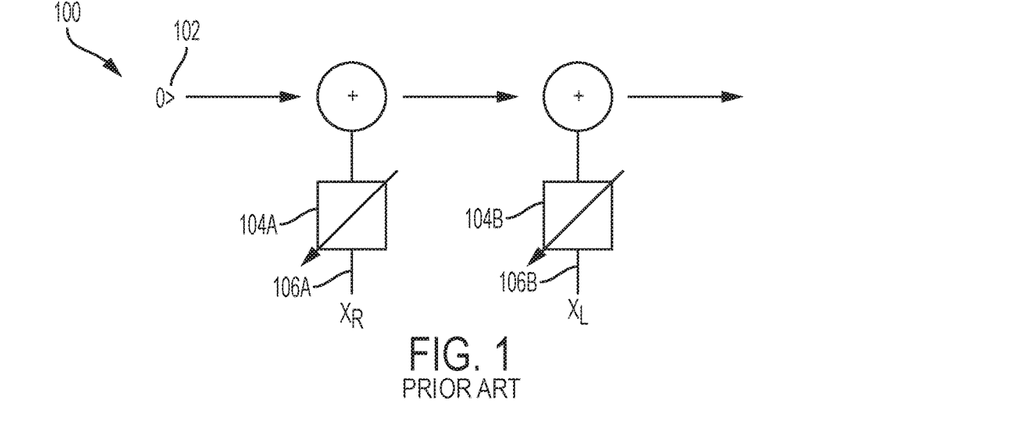
FIG. 1 is a block diagram illustrating a stereo acoustic echo cancellation (AEC) system according to the prior art.

FIG. 1 is a block diagram illustrating a stereo acoustic echo cancellation (AEC) system according to the prior art. AEC processing system 100 may receive a microphone signal from microphone 102. The microphone signal may include the user's speech and echo from each of the loudspeakers. Two AEC processing blocks 104A and 104B may be used to generate echo cancellation for each of the echoes from the loudspeakers of the device. One processing block 104B uses a left-channel reference signal $x_L$ 106B. The other processing block 104A uses a right-channel reference signal $x_R$ 106A. The two adaptive filters 104A and 104B are used to estimate the impulse responses of the left and right echo paths and compute the right and the left echo estimates using the right and left references 106A and 106B, respectively. The echo from the right loudspeaker acts as input for the left AEC. If the left and right channels are correlated, this will affect the performance of a mono AEC block in a way that the AEC block cannot correctly estimate the acoustic impulse responses (AIRs). The incorrect AIR estimate degrades the performance of processing of the microphone signal by slowing convergence of the echo cancellation algorithm, because the desired input signal cannot be correctly extracted from the microphone signal without correct AIR estimates and thus without correct AEC processing. The reduced performance may cause voice commands to be incorrectly recognized or not detected at all.

Shortcomings mentioned here are only representative and are included simply to highlight that a need exists for improved echo cancellation, particularly for audio processing employed in consumer-level devices. Embodiments described herein address certain shortcomings but not necessarily each and every one described here or known in the art. Furthermore, embodiments described herein may present other benefits than, and be used in other applications than, those of the shortcomings described above.

SUMMARY

Acoustic echo cancellation (AEC) processing may be improved by performing echo cancellation using a combined multi-channel reference signal. Rather than using multiple mono AEC blocks of the prior art shown in FIG. 1, two or more reference signals may be combined and provided to an AEC block configured to receive the combined signal and perform AEC processing using the combined signal. The AEC block may include an adaptive filter that performs operations that cause pre-whitening of the combined reference signal and de-correlation of the individual channels within the combined reference signal. The pre-whitening of the signal flattens the spectrum of the combined reference signal, which may improve convergence speed of the AEC processing in cancelling the echo. The de-correlating of the combined reference signal cancels the inter-channel correlation between the multiple channels, which may improve convergence speed of the AEC processing in cancelling the echo.

One method for acoustic echo cancellation (AEC) according to the present disclosure may include receiving a first channel reference signal indicative of a first channel of an audio signal for reproduction by a first transducer of an electronic device and receiving a second channel reference signal indicative of a second channel of the audio signal for reproduction by a second transducer of the electronic device. The two reference signals may be combined by combining a first portion of data selected from the first channel reference signal with a second portion of data selected from the second channel reference signal to form combined data having a size larger than either the first portion of data or the second portion of data alone. The combined data may be processed by pre-whitening the combined data in a frequency domain and generating an acoustic echo cancellation (AEC) signal based, at least in part, on the pre-whitened combined data. The pre-whitening and AEC signal generation may be performed in an AEC processing block having an adaptive filter, and optionally other components such as adders. The adaptive filter of the AEC processing block may be configured to support the larger size of the combined data of the multiple channel reference signal.

The AEC processing on the combined reference signal may be performed in the frequency domain in an adaptive filter. In the frequency domain, the pre-whitening and de-correlating may be performed simultaneously by the adaptive filter of the AEC block. The frequency domain processing has reduced computational requirements compared to time domain processing techniques. For example, in frequency domain processing, there is no cross-term determination for de-correlating the separate channels of the reference signals. Frequency domain processing may result in an increase in latency compared with time domain processing. However, the increase in latency may be tolerable in some applications to obtain the improved AEC processing or reduced computations requirements, such as in applications of "barge-in" voice commands wherein a voice command is received during playback of media or other audio such as speech from a telephone call. Such "barge-in" applications may be implemented on devices with low computational resources using the frequency domain processing described herein. Furthermore, the improved performance of frequency domain system obtained in embodiments described herein may allow an increase in the tail length of an AEC system with the limited available computational resources. In some embodiments, there may be a single AEC block for receiving the combined reference signal, such as when a left and right channel reference signal are combined and provided to a single AEC block. In some embodiments, other AEC blocks may be present for receiving other combined reference signals and/or other individual reference signals.

Electronic devices incorporating the AEC processing described herein may include electronic devices with audio outputs, such as digital assistants, music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, and the like. The AEC processing may improve detecting of voice command, such as voice commands received during playback of audio or during a telephone call.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 2:
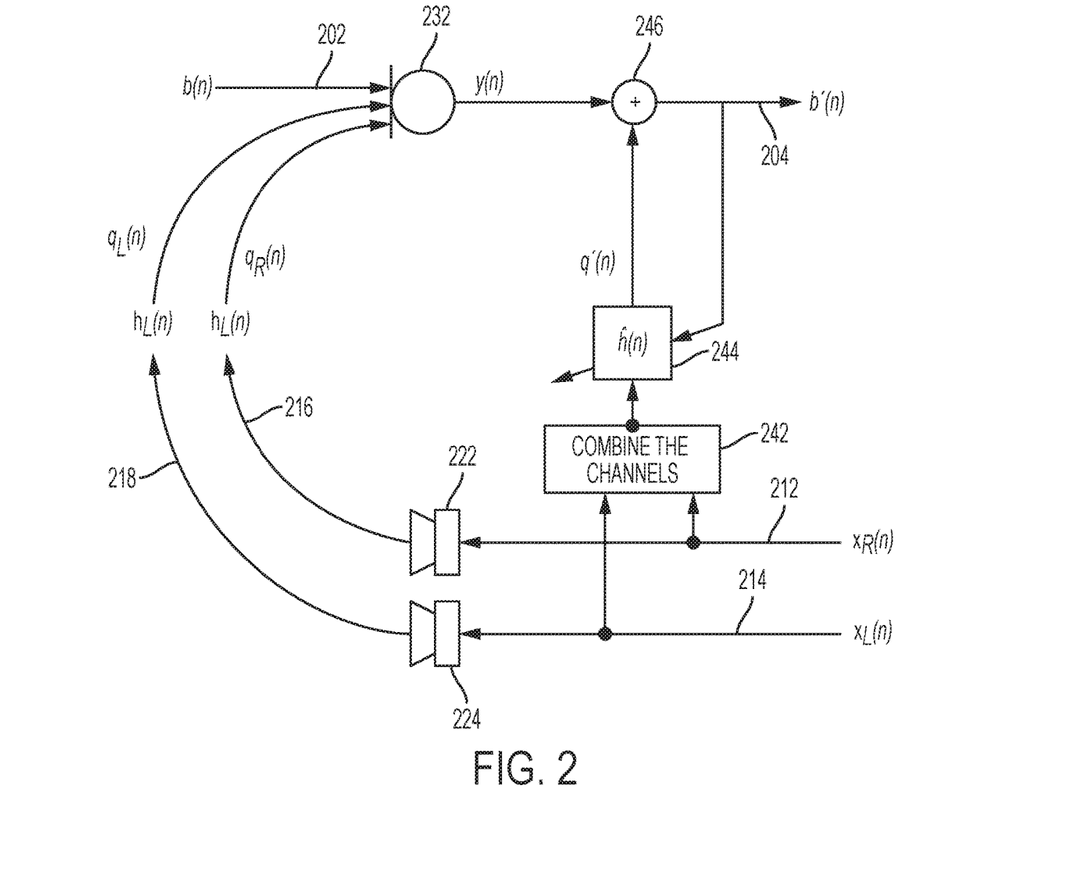
FIG. 2 is a block diagram illustrating a multi-channel acoustic echo cancellation (AEC) system with a combined reference signal according to some embodiments of the disclosure.

FIG. 2 is a block diagram illustrating a multi-channel acoustic echo cancellation (AEC) system with a combined reference signal according to some embodiments of the disclosure. A first reference signal $x_R(n)$ 212 and a second reference signal $x_L(n)$ 214 may be output to transducers 222 and 224, respectively. Although only two reference signals 212 and 214 are shown, a multi-channel audio signal may have two or more reference signals, such as two signals for a stereo source or six signals for a 5.1 surround source. The outputs of the transducers 222 and 224 are received by a microphone 232 as echo signals $q_L(n)$ 218 and $q_R(n)$ 216, respectively, along with a desired speech signal $b(n)$ 202. The microphone 232 outputs microphone signal $y(n)$, which is a combination of the signals $b(n)$, $x_R(n)$, and $x_L(n)$. To improve processing of audio input received by the microphone 232, acoustic echo cancellation (AEC) may be performed to obtain an estimate $q'(n)$ of the echo from the transducers 222 and 224. The estimated echo can be used to obtain an estimate of the desired speech signal $b'(n)$ by subtracting the estimated echo $q'(n)$ from the microphone signal $y(n)$. The desired speech signal may also be referred to as an estimate of the near-end component, wherein the near-end component refers to the desired speech signal $b(n)$. The estimate of the desired speech signal $b'(n)$ may then be used for an audio application, such as voice command recognition.

The estimated echo $q'(n)$ may be generated from a combined reference signal that is a combination of each channel of the multi-channel source. The first reference signal $x_R(n)$ 212 and the second reference signal $x_L(n)$ 214 may be input to a combiner 242. The combiner 242 may combine the signals 212 and 214 to obtain a combined reference signal, which is output to adaptive filter 244. The combiner 242 may combine the two signals 212 and 214 by, for example, concatenating or interleaving the two signals 212 and 214. The combiner 242 may alternatively implement other techniques for combining the two signals, such as by filtering or averaging. The adaptive filter 244 generates the estimated echo signal $q'(n)$ based on the combined reference signal and a feedback signal of the estimate of the desired speech signal $b'(n)$. The estimated signal $b'(n)$ may be obtained by subtracting the estimated echo signal $q'(n)$ from the microphone signal $y(n)$ at adder 246. The adaptive filter 244 may be configured to process block sizes with a size of a number of channels in the multi-channel source multiplied by a block size of the data, wherein the block size may be proportional to a sample rate of the reference signals 212 and 214. For example, when two signals are combined by combiner 242 to form combined data, the adaptive filter 244 may be configured to receive data that is twice the block size. Conventionally, an adaptive filter would be sized to the block size of a single channel and there would be no reason to configure a larger adaptive filter for processing a single channel. With a combined reference signal, as in embodiments of this disclosure, the adaptive filter 244 is configured based on a number of channels and the block size.

Figure 3:
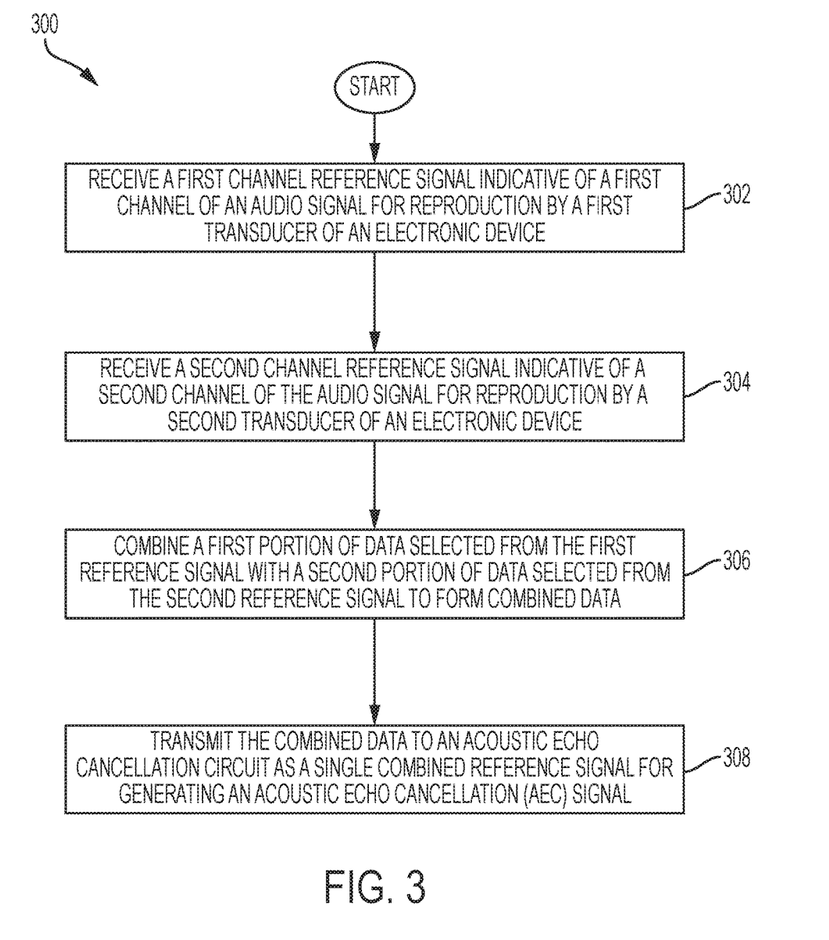
FIG. 3 is a flow chart illustrating an example method for combining reference signals from a multi-channel source for processing by an acoustic echo cancellation (AEC) system according to some embodiments of the disclosure.

The acoustic echo cancellation (AEC) system generates the estimated echo signal $q'(n)$ based on a combined reference signal. One method for preparing the combined reference signal is described with reference to FIG. 3. FIG. 3 is a flow chart illustrating an example method for combining reference signals from a multi-channel source for processing by an acoustic echo cancellation (AEC) system according to some embodiments of the disclosure. A method 300 may begin at block 302 with receiving a first channel reference signal indicative of a first channel of an audio signal for reproduction by a first transducer of an electronic device. Additionally, at block 304, a second channel reference signal is received that is indicative of a second channel of the audio signal for reproduction by a second transducer of the electronic device. Additional reference signals for other channels of a multi-channel source may be received in additional steps not shown in FIG. 3. The signals at blocks 302 and 304, along with other reference signals, may be received simultaneously or nearly simultaneously at the combiner 242, and the reference signals may buffered by the combiner 242 such as with a first-in-first-out (FIFO) buffer.

With each of the reference signals received and stored by the combiner 242, the signals may be combined and transmitted for further processing by the AEC system. At block 306, a first portion of data selected from the first reference signal may be combined with a second portion of data selected from the second reference signal. In one example step of combining the signals, blocks of data from the first signal may be concatenated with blocks of data from the second signal by alternating data of the first signal with data of the second signal. In another example step of combining the signals, slices of data from the first signal may be alternated with slices of data from the second signal. In yet another example step of combining the signals, frames of data from the first signal may be alternated with frames of data from the second signal. After the signals are combined at block 306, the combined data signal may be transmitted, at block 308, to an adaptive filter, or other component of an AEC system. The combined signal may be pre-whitened or otherwise processed by the AEC system within an audio controller.

Figure 4:
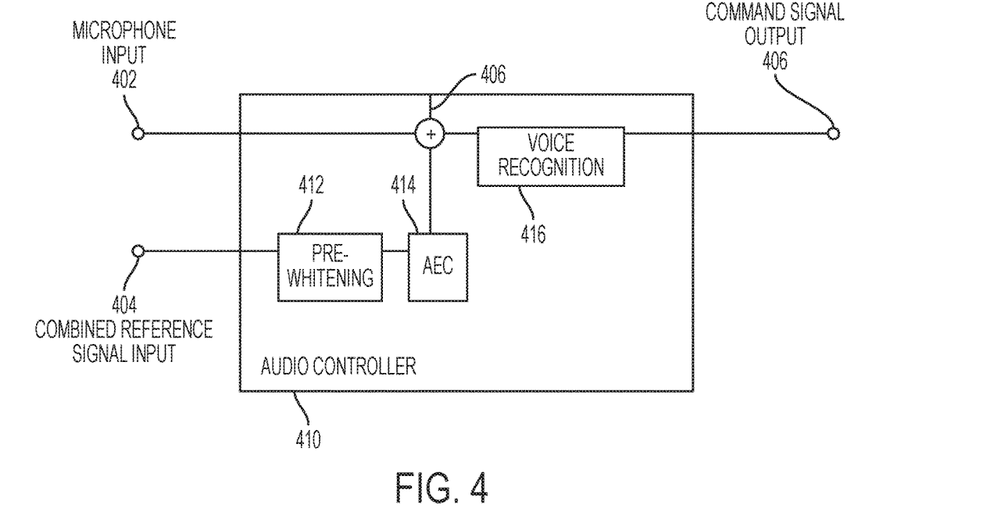
FIG. 4 is a block diagram illustrating an example controller for an acoustic echo cancellation (AEC) system processing a combined reference signal input according to some embodiments of the disclosure.

An example audio controller for processing the combined reference signal is shown in FIG. 4. FIG. 4 is a block diagram illustrating an example controller for an acoustic echo cancellation (AEC) system processing a combined reference signal input according to some embodiments of the disclosure. An audio controller 410 may include input nodes 402 and 404 for receiving a microphone signal and a combined reference signal, respectively. The combined reference signal received at input node 404 may be processed by pre-whitening block 412 and then to AEC block 414 to generate an estimated echo signal q'(n). Generation of an estimated echo signal q'(n) from a reference signal by an acoustic echo canceler is beyond the scope of this disclosure, and techniques for generating such estimate echo signal are known by those skilled in the relevant art. An adaptive filter, such as adaptive filter 244, may be used to implement the pre-whitening block 412 and the AEC block 414.

The estimated echo signal q'(n) may be subtracted by block 406 from the received microphone signal. The resultant signal is an estimate of desired speech signal b'(n). The b'(n) signal may include sounds for further processing. For example, the b'(n) signal may include speech that is part of a telephone conversation. The b'(n) signal may be compressed and transmitted to a network connection. As another example, the b'(n) signal may include voice commands. Voice commands of the b'(n) signal may be input to voice recognition block 416, which may search for a trigger word and/or a command. The detected command speech may be converted into a command signal for output to output node 406. The command signal may be a digital code or other digital representation of the spoken command. For example, the digital output at output node 406 may operate a device to start or stop music playback, initiate a phone call to a designated recipient, send a SMS text message or Internet chat message to a designated recipient, turn on or off light bulbs, turn on or off electronic equipment, or order goods or services. The audio controller 410 may be installed in electronic devices such as home assistants, mobile phones, tablet computers, laptop computers, stereo equipment, Bluetooth speakers, Bluetooth headsets, Bluetooth headphones, televisions, set-top boxes, or the like.

Figure 5:
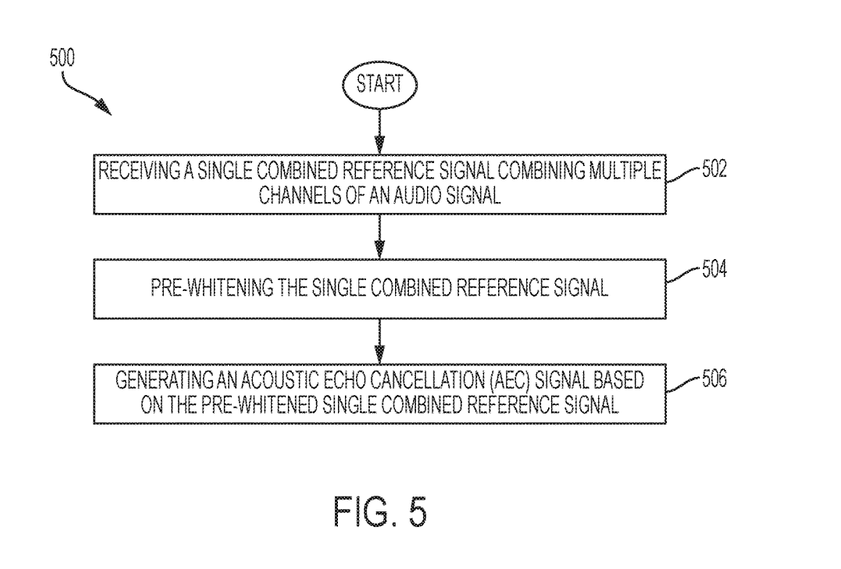
FIG. 5 is a flow chart illustrating an example method for acoustic echo cancellation (AEC) with a combined reference signal according to some embodiments of the disclosure.

A method for processing a combined reference signal, such as may be performed by the audio controller 410, is illustrated in FIG. 5. FIG. 5 is a flow chart illustrating an example method for acoustic echo cancellation (AEC) with a combined reference signal according to some embodiments of the disclosure. A method 500 begins at block 502 with a controller or other circuit receiving a single combined reference signal that combines multiple channels of an audio signal. Then, at block 504, pre-whitening is applied to the single combined reference signal, which may also result in decorrelation of the channels of the multiple channels. The pre-whitening may result in a signal with a flattened spectrum, which can improve convergence speed of the AEC system. Then, at block 506, an echo cancellation signal is generated based on the pre-whitened single combined reference signal.

Figure 6:
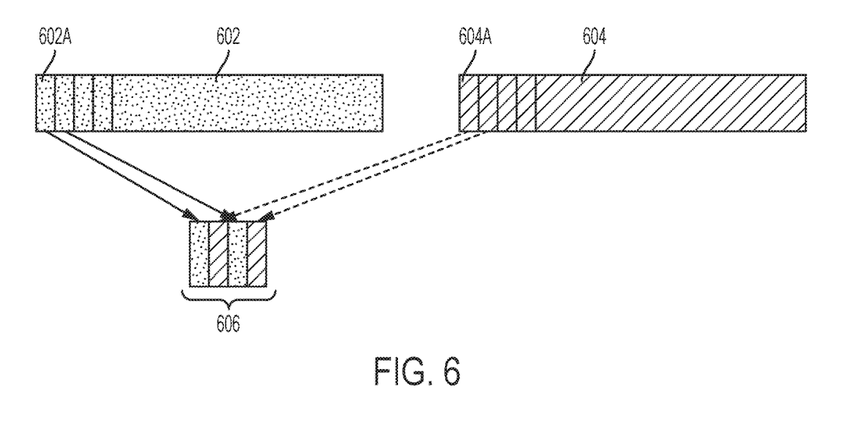
FIG. 6 is a block diagram illustrating generation of a combined reference signal by interleaving according to some embodiments of the disclosure.
Figure 7:
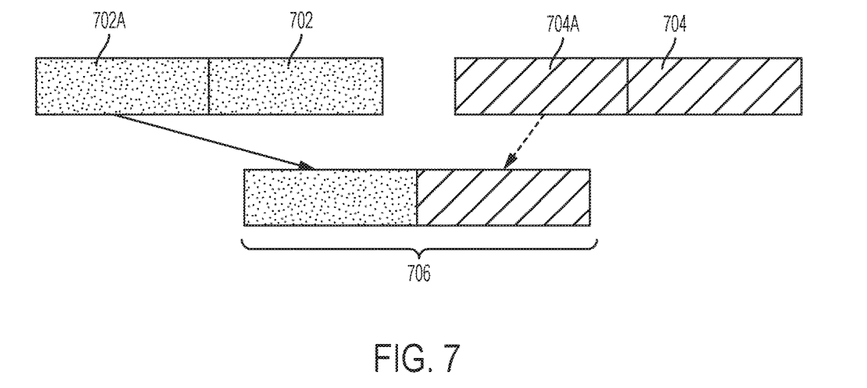
FIG. 7 is a block diagram illustrating generation of a combined reference signal by concatenation according to some embodiments of the disclosure.

The reference signals may be combined through one of several operations. Example operations of interleaving and concatenation are shown in FIG. 6 and FIG. 7. FIG. 6 is a block diagram illustrating generation of a combined reference signal by interleaving according to some embodiments of the disclosure. When interleaving, a slice 602A of first data 602 from a first signal is selected and placed in combined signal 606. Then, a slice 604A of second data 604 from a second signal is selected and placed in combined signal 606. The combined signal 606 is formed by alternating between selecting slices from the first data 602 and the second signal 604. Each of the slices may have a sample size based on the sample rate (e.g., 16 kHz or 24 kHz) of the data. There may be several slices in a block of data from the signals. An alternative to interleaving as described with reference to FIG. 6 is concatenation shown in FIG. 7. The first data 602 and second data 604 may be buffered by the AEC system such that an entire block of combined data 606 may be formed and transmitted for further processing.

Another operation of combining data is concatenation as shown in FIG. 7. FIG. 7 is a block diagram illustrating generation of a combined reference signal by concatenation according to some embodiments of the disclosure. A combined signal 706 may be formed by selecting a first block 702A from first data 702 of a first signal and placing the block in the combined signal 706. Then, a second block 704A is selected from second data 704 of a second signal and placed in the combined signal 706. Blocks may continue to be selected from first data 702 and then second data 704 to form the combined signal 706. The amount of data in the blocks 702A and 704A may be determined by a tail length of the AEC system. The tail length may be selected for an AEC system based on room size, reverberance, type of device, and processor and memory capability of the device. Some tail lengths may be between approximately 16-128 milliseconds. Longer tail lengths may increase computational resources required by the adaptive filter, but any increase may be offset by the generally lower computational resources used by frequency domain processing.

Figure 8:
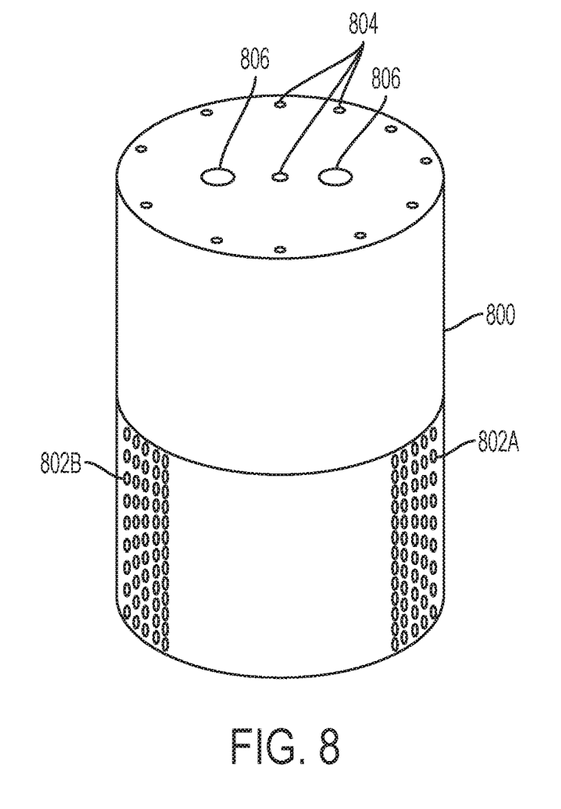
FIG. 8 is a perspective view of a digital assistance device with acoustic echo cancellation (AEC) of a combined multi-channel reference signal according to some embodiments of the disclosure.

FIG. 8 is a perspective view of a digital assistance device, such as a home assistant, with acoustic echo cancellation (AEC) of a combined multi-channel reference signal according to some embodiments of the disclosure. An electronic device 800 may include speakers 802A and 802B configured to play different channels of an audio source. The electronic device 800 may also include an array 804 of microphones. Acoustic echo cancellation (AEC) may be performed on input signals received from individual microphones of the array 804 or a collective signal received from the array 804. AEC may be performed by an audio controller embedded in the electronic device 800. AEC may be performed by combining reference signals corresponding to outputs of the speakers 802A and 802B, and performing pre-whitening or other processing by an adaptive filter on the combined reference signal. The adaptive filter of the audio controller embedded in the electronic device 800 may be configured to accept input data having a width of a block size of the audio signal output to the speakers 802A and 802B multiplied by two (the number of channels output to speakers 802A and 802B). Other user interface controls, such as buttons 806, may be provided on the electronic device 800. The controls may be used to start and stop music playback from speakers 802A and 802B. While music is played back, a user may provide input through the array 804 of microphones, such as by speaking a command. To improve recognition of the voice command, AEC processing is performed by the audio controller to extract the voice command from other sounds and generate control signals for operating the electronic device 800 or controlling other systems. For example, during playback of music by the device 800, a user may speak a voice command to change the track. The electronic device 800 may receive the voice command through the array 804, apply AEC to the received signal to extract the user's speech, recognize the command in the user's speech, and then skip music playback to the next track. As another example, during playback of music by the device 800, a user may speak a voice command to control light bulbs that are connected to the same network as the device 800. The electronic device 800 may receive the voice command through the array 804, apply AEC to the received signal to extract the user's speech, recognize the command in the user's speech, and then transmit a network packet to the light bulb or to a remote server to control the light bulb in accordance with the recognized command.

Figure 9:
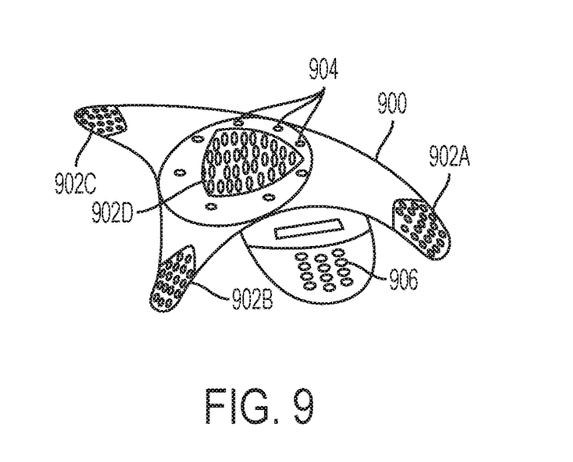
FIG. 9 is a perspective view of a conference telephone with acoustic echo cancellation (AEC) of a combined multi-channel reference signal according to some embodiments of the disclosure.

Another example of AEC processing with a combined multi-channel reference signal is described with reference to FIG. 9. FIG. 9 is a perspective view of a conference telephone with acoustic echo cancellation (AEC) of a combined multi-channel reference signal according to some embodiments of the disclosure. A conference bridge 900 may include speakers 902A, 902B, 902C, and 902D for outputting audio from a telephone conference call. An array 904 of microphones may receive speech from within a room as part of the telephone conference call. An audio controller embedded in the device 900 may receive the microphone signals from the array 904 and reference signals corresponding to the output channels to speakers 902A-D. The reference signals may be used to form a combined multi-channel refence signal according to one of the examples of FIG. 6 or FIG. 7 or another technique. The combined reference signal may be used to generate an AEC signal that can be combined, to perform echo cancellation, with individual outputs of the array 904 or a combined output of the array 904. After the AEC signal is combined with the output of array 904, the resulting signal is the user's speech, which may be encoded and transmitted through a wired or wireless telecommunications network.

The electronic devices illustrated in FIG. 8 and FIG. 9 are only representative examples for uses of the techniques for AEC processing of a combined multi-channel reference signal described herein. Other electronic devices may implement methods for combining reference signals and performing AEC processing using a combined reference signal. Some other examples of such electronic devices include music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, and the like. Integrated circuits (ICs), such as an audio controller, may be embedded in any of these electronic devices and configured to perform some or all of the AEC processing described herein.

The schematic flow chart diagrams of FIG. 3 and FIG. 5 are generally set forth as a logical flow chart diagram. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. The firmware and/or software may include instructions that cause the processing of signals, such as a combined multi-channel reference signal for AEC processing, described herein to be performed. In some embodiments, the integrated circuit (IC) that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, where general purpose processors are described as implementing certain processing steps, the general purpose processor may be a digital signal processors (DSPs), a graphics processing units (GPUs), a central processing units (CPUs), or other configurable logic circuitry. As another example, although processing of audio data is described, other data may be processed through the filters and other circuitry described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
a controller configured to perform steps comprising:
receiving a single combined reference signal comprising a combination of a first channel of an audio signal for reproduction by a first transducer and a second channel of the audio signal for reproduction by a second transducer;
pre-whitening the single combined reference signal in a frequency domain; and
generating an acoustic echo cancellation (AEC) signal based, at least in part, on the pre-whitened single combined reference signal.

2. The apparatus of claim 1, wherein the step of pre-whitening the single combined reference signal results in pre-whitening the single combined reference signal and decorrelating the first channel and the second channel.

3. The apparatus of claim 1, wherein the controller is further configured to perform steps comprising:
receiving an input signal from a microphone, wherein the input signal comprises a voice command for controlling the electronic device in a near-end component;
calculating an estimate of the near-end component based, at least in part, on the input signal and the AEC signal; and
extracting the voice command from the estimated near-end component.

4. The apparatus of claim 1, wherein the controller comprises a digital signal processor (DSP) and the apparatus comprises a digital assistance device.

5. The apparatus of claim 1, wherein the apparatus comprises:
a plurality of transducers comprising at least the first transducer and the second transducer configured to reproduce audio content of the first channel and the second channel, respectively, of the audio signal; and
a combiner module configured to combine the first channel and the second channel to form the single combined reference signal for output to the audio controller.

6. The apparatus of claim 5, further comprising a microphone coupled to the controller, wherein the controller is configured to perform steps comprising:
receiving an input signal from the microphone; and
estimating a near-end component of the input signal based, at least in part, on the input signal and the AEC signal.

7. The apparatus of claim 5, wherein the combiner module is configured to interleave samples of the first channel of the audio signal with samples of the second channel of the audio signal to form the combined data.

8. The apparatus of claim 5, wherein the combiner module is configured to concatenate a block from the first channel of the audio signal with a block from the second channel of the audio signal.

9. A method, comprising:
receiving a first channel reference signal indicative of a first channel of an audio signal for reproduction by a first transducer of an electronic device;
receiving a second channel reference signal of a second channel of the audio signal for reproduction by a second transducer of the electronic device;
combining a first portion of data selected from the first channel reference signal with a second portion of data selected from the second channel reference signal to form combined data having a size larger than either the first portion of data or the second portion of data alone; and
transmitting the combined data to an acoustic echo cancellation circuit as a single combined reference signal for generating an acoustic echo cancellation (AEC) signal.

10. The method of claim 9, further comprising pre-whitening the single combined reference signal in a frequency domain.

11. The method of claim 10, wherein the step of pre-whitening the single combined reference signal results in pre-whitening the single combined reference signal and decorrelating the first channel reference signal and the second channel reference signal.

12. The method of claim 10, further comprising:
receiving an input signal from a microphone, wherein the input signal comprises a voice command for controlling the electronic device in a near-end component;
generating an acoustic echo cancellation (AEC) signal from the pre-whitened single combined reference signal; and
calculating an estimate of the near-end component of the input signal based, at least in part, on the input signal and the AEC signal.

13. The method of claim 9, wherein the step of combining comprises interleaving samples of the first channel reference signal with samples of the second channel reference signal to form the combined data.

14. The method of claim 9, wherein the step of combining comprises concatenating a block from the first channel reference signal with a block from the second channel reference signal.

15. A method, comprising:
receiving a first channel reference signal indicative of a first channel of an audio signal for reproduction by a first transducer of an electronic device;
receiving a second channel reference signal indicative of a second channel of the audio signal for reproduction by a second transducer of the electronic device;
combining a first portion of data selected from the first channel reference signal with a second portion of data selected from the second channel reference signal to form combined data having a size larger than either the first portion of data or the second portion of data alone;
pre-whitening the combined data in a frequency domain; and
generating an acoustic echo cancellation (AEC) signal based, at least in part, on the pre-whitened combined data.

16. The method of claim 15, wherein the step of pre-whitening the combined data results in pre-whitening the combined data and decorrelating the first channel reference signal and the second channel reference signal.

17. The method of claim 15, further comprising:
receiving an input signal from a microphone, wherein the input signal comprises a voice command for controlling the electronic device in a near-end component;
calculating an estimate of the near-end component based, at least in part, on the input signal and the AEC signal; and
extracting the voice command from the near-end component estimate.

18. The method of claim 17, further comprising controlling the electronic device based on the voice command to transmit a signal to a remote computer system.

19. The method of claim 15, wherein the step of combining comprises interleaving samples of the first channel reference signal with samples of the second channel reference signal to form the combined data.

20. The method of claim 15, wherein the step of combining comprises concatenating a block from the first channel reference signal with a block from the second channel reference signal.

* * * * *